(12) United States Patent
Parry et al.

(10) Patent No.: US 6,358,497 B2
(45) Date of Patent: *Mar. 19, 2002

(54) SURFACTANTS FOR STRUCTURING NON-AQUEOUS LIQUID COMPOSITIONS

(75) Inventors: Diane Parry, Cincinnati, OH (US); Walter August Maria Broeckx, Zele (BE); Daniel Jerome White, Jr., North Bend; Mark Allen Smerznak, Cincinnati, both of OH (US)

(73) Assignee: The Procter & Gamble Company, Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/252,953

(22) Filed: Feb. 18, 1999

Related U.S. Application Data

(60) Provisional application No. 60/075,033, filed on Feb. 18, 1998.

(51) Int. Cl.[7] ................... A61K 7/135; A61K 7/075; A61K 9/14; C11D 3/00
(52) U.S. Cl. .................. 424/62; 424/70.19; 424/70.21; 424/70.24; 424/70.27; 424/70.31; 424/489; 510/127; 510/302; 510/312; 510/439
(58) Field of Search .................. 424/400, 401, 424/62, 70.24, 489, 70.31, 70.27, 70.21, 70.19; 510/439, 127, 302, 312

(56) References Cited

U.S. PATENT DOCUMENTS

| | | | | |
|---|---|---|---|---|
| 4,913,828 A | * | 4/1990 | Caswell et al. | 252/88 |
| 5,534,195 A | * | 7/1996 | Chapman et al. | 510/444 |
| 5,565,556 A | * | 10/1996 | Heinzman et al. | 536/105 |
| 5,677,272 A | * | 10/1997 | Ghosh et al. | 510/306 |
| 5,686,401 A | * | 11/1997 | Willey et al. | 510/313 |
| 5,814,592 A | | 9/1998 | Kahn et al. | 510/304 |

FOREIGN PATENT DOCUMENTS

| | | | |
|---|---|---|---|
| WO | 98/00514 | 1/1998 | C11D/17/00 |
| WO | 98/00516 | 1/1998 | C11D/17/00 |
| WO | 98/00518 | 1/1998 | C11D/17/00 |
| WO | 99/00477 | 1/1999 | C11D/17/00 |

OTHER PUBLICATIONS

Smerznak et al.; U.S. Appl. No. 08/881,457; filed Jun. 24, 1997; Non–Aqueous, Particulate–Containing Liquid Detergent Compositions With Surfactant–Structured Liquid Phase.

Kahn et al.; U.S. Appl. No. 09/202,964; filed Dec. 23, 1998; Preparation of Non–Aqueous, particulate–Containing Liquid Detergent Compositions With Surfactant–Structured Liquid Phase.

* cited by examiner

Primary Examiner—Thurman K. Page
Assistant Examiner—Humera N. Sheikh
(74) Attorney, Agent, or Firm—C. Brant Cook; Kim W. Zerby; Steven W. Miller (57) ABSTRACT

A surfactant system capable of structuring a non-aqueous liquid composition, wherein the surfactant system comprises at least about 5% of a structuring particle. The surfactant system preferably further comprises a surfactant selected from the group consisting of anionic, nonionic, cationic, amphoteric surfactants and mixtures thereof. A well dispersed mixture of a non-aqueous liquid, for example, a nonionic surfactant, and at least about 25%, by weight of the surfactant system results in the mixture having a yield of at least about 2.0 Pa when measured at 20 sec$^{-1}$ and 25° C. Moreover, the surfactant system should exhibit a peak when measured by SAXS x-ray diffraction, wherein the peak's center is between about the 1.5 to 2.5 v positions on the 2 theta axis. The structuring particles are most preferably structuring particles of sulfate and linear alkyl benzene sulfonate. Also provide is a method of making the structuring particle.

37 Claims, 4 Drawing Sheets

The two dimensional SAXS patterns of the different liquid bases.

Fig. 4

SURFACTANTS FOR STRUCTURING NON-AQUEOUS LIQUID COMPOSITIONS

This application claim benefit to provisional 60/075,033 filed Feb. 18, 1998.

TECHNICAL FIELD

This invention is in the field of structuring particles. Specifically, surfactant systems comprising a sufficient concentration of a surfactant that can structure a non-aqueous liquid.

BACKGROUND OF THE INVENTION

Structured liquids, for example, gels and certain non-Newtonian fluids, have numerous applications and have gained great favor among consumers. For example, many paints are supplied as liquids that are structured in situ, that is, the structure is established in the container as the paint is mixed. Paint is typically structured in an attempt to evenly suspended fine, solid pigment particles in the liquid paint carrier. But as most consumers of paint products are well aware, more often than not when paint is purchased the pigment particles have settled to the bottom of the container. This occurs when the structure of the paint is broken down by the normal jostling during shipping and handling of the containerized paint. Once the structure is broken down it cannot be reestablished, and the paint must be shaken or stirred before each use to resuspend the pigment particles. The necessity of shaking or stirring, which is often a messy procedure, is the bane of painting.

Among the most common structurants for liquid compositions are clay compounds. While clay provides good in situ structuring for certain liquid environments, clay structured systems are inherently unstable. Liquids structured with clay and other conventional structurants rely of a delicate balancing of particle forces that when disturbed cause the structure to break down. Specifically, two particles are often attracted due to natural forces such as van der Waals forces. But if brought too close together two particles will normally repel one another due to natural repulsive forces between particles. Also, entropy works to break down weakly structured systems. Hence, structured liquids are fragile and the structure is easily broken down.

Conventional surfactants have also been used to structure liquids. But surfactant structures are inherently weak because they rely on a weak ordering of the surfactant molecules. More specifically, surfactants molecules are know to arrange themselves wherein the head groups agglomerate forming micelles or inverse micelles, which individually can act as structuring bodies. Unfortunately, as is the case with clay structured liquids, the structure relies on relatively weak intermolecular attractive forces, rather than actual chemical or physical bonding. Liquids structured with conventional surfactants are generally unstable.

Additionally, structure within a liquid can be broken down by the addition of chemicals that adversely affect interparticle forces. For example, liquids structured with clay, surfactants or polymers are sensitive to the electrolyte composition of the liquid. Unfortunately, electrolytes are desirable for use in many liquid compositions such as heavy duty liquid laundry detergents, which makes the structuring of these liquids especially difficult. Often the instability problems of structured heavy duty liquid detergent compositions are addressed by maintaining very tight controls over the formulation of these detergents, and by using less than the amount of certain chemicals than would be dictated by performance alone. In other words, performance characteristics and economics are often sacrificed to achieve the desired liquid aesthetics.

These and other problems are solved by the structuring particles of the present invention. The problems associated with structuring liquids that are discussed above, occur in non-aqueous solutions, for example, oil base paint, as well as aqueous systems. The present invention, however, is primarily directed to structuring non-aqueous liquids.

To address the problems and shortcomings of available liquid structurants there is a continuing need for new compositions that can produce relatively stable structured liquids. Moreover, there exists a need for a liquid structurant that is relatively insensitive to the chemical composition of the liquid being structured, and is tolerant of normal physical agitation.

SUMMARY OF THE INVENTION

The present invention provides a surfactant system capable of structuring a non-aqueous liquid composition, wherein the surfactant system comprises at least about 5%, by weight of a structuring particle. The surfactant system preferably further comprises a surfactant selected from the group consisting of anionic, nonionic, cationic, amphoteric surfactants and mixtures thereof.

In one preferred embodiment of the present invention, there is provided a well dispersed mixture of at least about 25%, by weight of the surfactant system and a $C_{12-13}$ alcohol ethoxylate with an average degree of ethoxylation of 5, which results in the mixture having a yield of at least about 2.0 Pa when measured at 20 $sec^{-1}$ and 25° C.

In another preferred embodiment of this invention, the surfactant system and the structuring particles exhibit a peak when measured by SAXS x-ray diffraction, and the peak's center is between about the 1.5 to 2.5 positions on the 2 theta axis.

The structuring particles are preferably not soluble in non-aqueous liquids such as butoxy propoxy propanol, cyclohexane, nonionic surfactants and mixtures thereof. Also, the structuring particles are preferably soluble in aqueous liquids.

In one preferred embodiment of the present invention the structuring particle is a particle comprising sulfate and a surfactant which comprises a sulfonate head group, and more preferably the structuring particle comprises sulfate and $C_{6-20}$ linear alkyl benzene sulfonate.

In another aspect of the present invention a method of making a structuring particle is provided. The method comprises the steps of:

a) making a surfactant paste comprising an alkali metal surfactant, preferably sodium linear alkyl benzene sulfonate, and an aqueous solution, which is preferably water, in a ratio of from about 2:1 to about 1:4, preferably from about 1:1 to about 1:3;

b) combining the paste and an alkali metal sulfate, preferably sodium sulfate, in a ratio of metal surfactant to metal sulfate of from about 4:1 to about 1:2, preferably from about 3:1 to about 1:1;

c) agitating the paste and the metal sulfate until a well dispersed mixture is obtained;

d) allowing the well dispersed mixture to stand with no agitation for at least about two hours, preferably at least about 6 hours and most preferably at least about 12 hours; and e) drying the well dispersed mixture, preferably on a drum dryer.

Surprisingly, it has been determined that the surfactant systems and structuring particles of this invention can structure non-aqueous solutions in the presence of numerous chemical compositions that can break-down conventional liquid structures. The ability to structure a variety of different non-aqueous solutions allows the surfactant system and structuring particles of this invention to be useful in numerous commercial liquid compositions, for example, to suspend particles in a liquid environment. Paint products, agricultural products and liquid laundry compositions are but a few of the commercial applications for the structurants of the present invention. In the paint arena, an ancillary benefit is achieved by using the surfactant systems and structuring particles of this invention. Because the structurant may also be a surfactant, paint is more easily removed from the brushes and rollers due the natural surfactancy of the paint/surfactant combination.

In addition to their ability to structure non-aqueous liquids, the surfactant systems and structuring particles of this invention have shown superior, and unexpected dissolution properties in aqueous solutions. For example, conventional linear alkyl benzene sulphonate dissolves in water at an appreciably slower rate and to a lesser degree than does a surfactant system comprising conventional linear alkyl benzene sulphonate and at least about 5% of structuring particles of sulfate and linear alkyl benzene sulphonate, that is, at least about 5% of a structuring particle, according to the present invention.

BRIEF DESCRIPTION OF THE DRAWINGS

While the Specification concludes with claims that define this invention with particularity, it is believed that this invention will be better understood with reference to the following Detailed Description and with reference to the drawings wherein:

DETAILED DESCRIPTION OF THE INVENTION

The present invention provides a surfactant system capable of structuring a non-aqueous liquid composition, wherein the surfactant system comprises at least about 5%, preferably at least about 6%, more preferably at least about 8%, and most preferably at least about 10% of a structuring particle that is essentially insoluble in non-aqueous liquids. The structuring particle preferably comprises a surfactant selected from the group consisting of anionic, nonionic, cationic, amphoteric surfactants and mixtures thereof. The surfactant system preferably further comprises a surfactant selected from the group consisting of anionic, nonionic, cationic, amphoteric surfactants and mixtures thereof.

As used herein the term "structuring particle" is intended to mean any particle-like materials that are insoluble in, and can structure a non-aqueous liquid. That is, when the "structuring particles" of this invention are mixed with a non-aqueous liquid the mixture should have a yield value as defined below, and/or exhibit certain x-ray diffraction patterns as defined below. By "essentially insoluble in a non-aqueous liquid" it is meant that less than about 10%, preferably less than about 5% and most preferably less than about 2% of the structuring particles of this invention dissolve in non-aqueous liquids such as butoxy propoxy propanol, cyclohexane, nonionic surfactants and mixtures thereof. As used herein the term "non-aqueous" means any liquid or solution that comprises less than about 5% water, preferably less than about 2% water, and most preferably less than about 1% water, all percentages are by weight. As used herein "well dispersed" means that there are no agglomerations of surfactant or other materials in the mixture that are visible to the naked eye. All concentrations reported herein are by weight unless otherwise specified.

Figure 1:
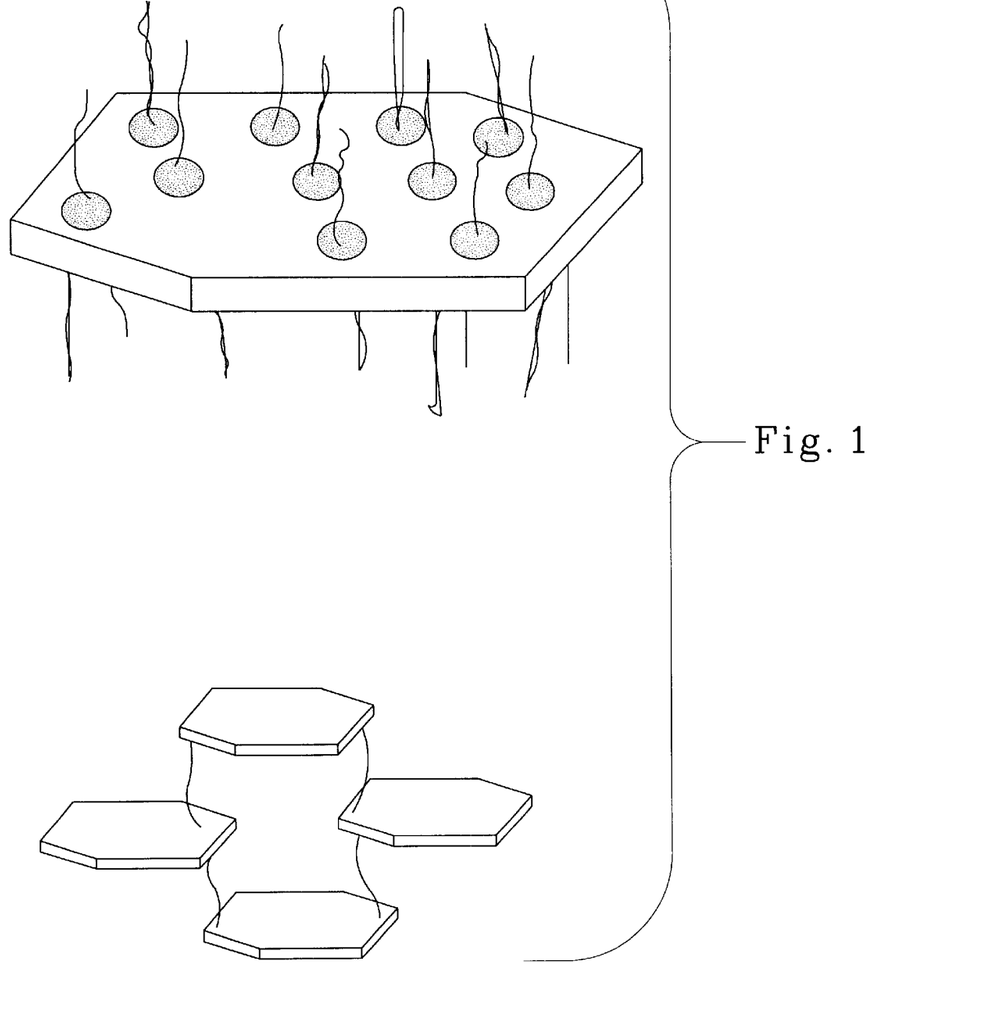
FIG. 1 is a schematic representation of one possible configuration of the structuring particles of the present invention.

While not wanting to be bound by any one theory, it is believed that when certain surfactants are processed under certain conditions in the presence of other chemicals, for example, sulfate, "particles" comprising ordered or adsorbed arrangements of the surfactant molecules are formed on sulfate flakes or crystals. FIG. 1 depicts such an ordered arrangement of sodium linear alkyl benzene sulfonate around a crystal of sodium sulfate. It is believed that the sulfonate head group of the linear alkyl benzene sulfonate is attracted to the sulfate crystals as shown in FIG. 1. Synchrotron studies of structuring particles according to this invention are consistent with the model depicted in FIG. 1.

When a sulfate crystal is essentially "coated" with the sulfonate head groups, as shown in FIG. 1, the resulting "particles" becomes essentially insoluble in non-aqueous liquids. Because of the particles' composition, and possibly because of their shape, the particles of this invention form excellent structures in non-aqueous liquids, as modeled in FIG. 1. The structure formed in a non-aqueous liquid by the structuring particles of this is invention appears to be a steric stabilization of the undissolved particles. That is, the structure relies primarily on mechanical forces rather than weak inter-particle charge or hydrogen bonding forces between molecules or particles. Hence, liquids structured with the structuring particles of this invention are especially resilient to changes in the solution chemistry.

An added benefit of the particle arrangement of the structuring particles of this invention is that they dissolve more thoroughly and more quickly in aqueous solutions than do comparable surfactants. While the present invention is directed primarily to structuring non-aqueous liquids, the added benefit of superior and unexpected dissolution properties of the present structuring particles has many commercial applications as well.

Many surfactants will form the structuring particles of this invention, but especially preferred surfactants for use herein are those with sulfonate head groups. As discussed above, and as schematically shown in FIG. 1, the structuring particles of this invention can be formed by bonding of the surfactant head group to a crystal. Sulfonate groups have an affinity for sulfate crystals resulting in an exceptionally stable structuring particle according to the present invention.

It is preferred that the non-structuring surfactant of the surfactant systems of this invention be soluble in the non-aqueous liquid that is to be structured. It has been determined that if a surfactant system according to the present invention, which comprises a surfactant and structuring particles according to this invention, is added to a non-aqueous liquid and the surfactant is not soluble in the non-aqueous liquid, the preferred highly shear thinning structuring will generally not occur. It is believed that the undissolved surfactant inhibits the structuring properties of the structuring particles, or that the surfactant simply inhibits the structuring particles from being dispersed in the non-aqueous liquid. Regardless of the mechanism, it is generally preferred that the surfactant in the surfactant systems of this invention be soluble in the non-aqueous liquids that are to be structured. Again, the structuring particles of the present invention should be insoluble in the non-aqueous liquid matrixes that are being structured.

While the present invention is described in terms of specific examples and compositions, the present invention is not meant to be so limited. Linear alkyl benzene sulfonate is used throughout this disclosure as an exemplary surfactant, and a structuring particle of sulfate and $C_{6-20}$ linear alkyl benzene sulfonate is a preferred structuring particle as defined herein. But the scope of the present invention is intended to encompass all structuring particles that fall within the yield measurements and x-ray diffraction patterns as defined below. Likewise, all structuring particles made by the processes defined herein are intended to be within the scope of this invention.

Yield Measurements

Liquids structured with the structuring particles of the present invention are typically shear thinning, non-Newtonian fluids. Shear thinning, non-Newtonian fluids are characterized by having higher yield values than non-structured, Newtonian fluids, such as water. For example, a liquid that is a structured gel at rest, but pours as a thin, water-like liquid is typical of a shear thinning, non-Newtonian fluid. The force required to pour a structured gel can often be applied by simply tipping the bottle that contains the structured gel material, wherein gravity acts on the fluid in the bottle providing sufficient force to overcome the yield of the fluid. As discussed below, the yield value is a measurement of the force required to move a liquid from its rest position, or the force required to stop a fluid from moving.

Figure 2:
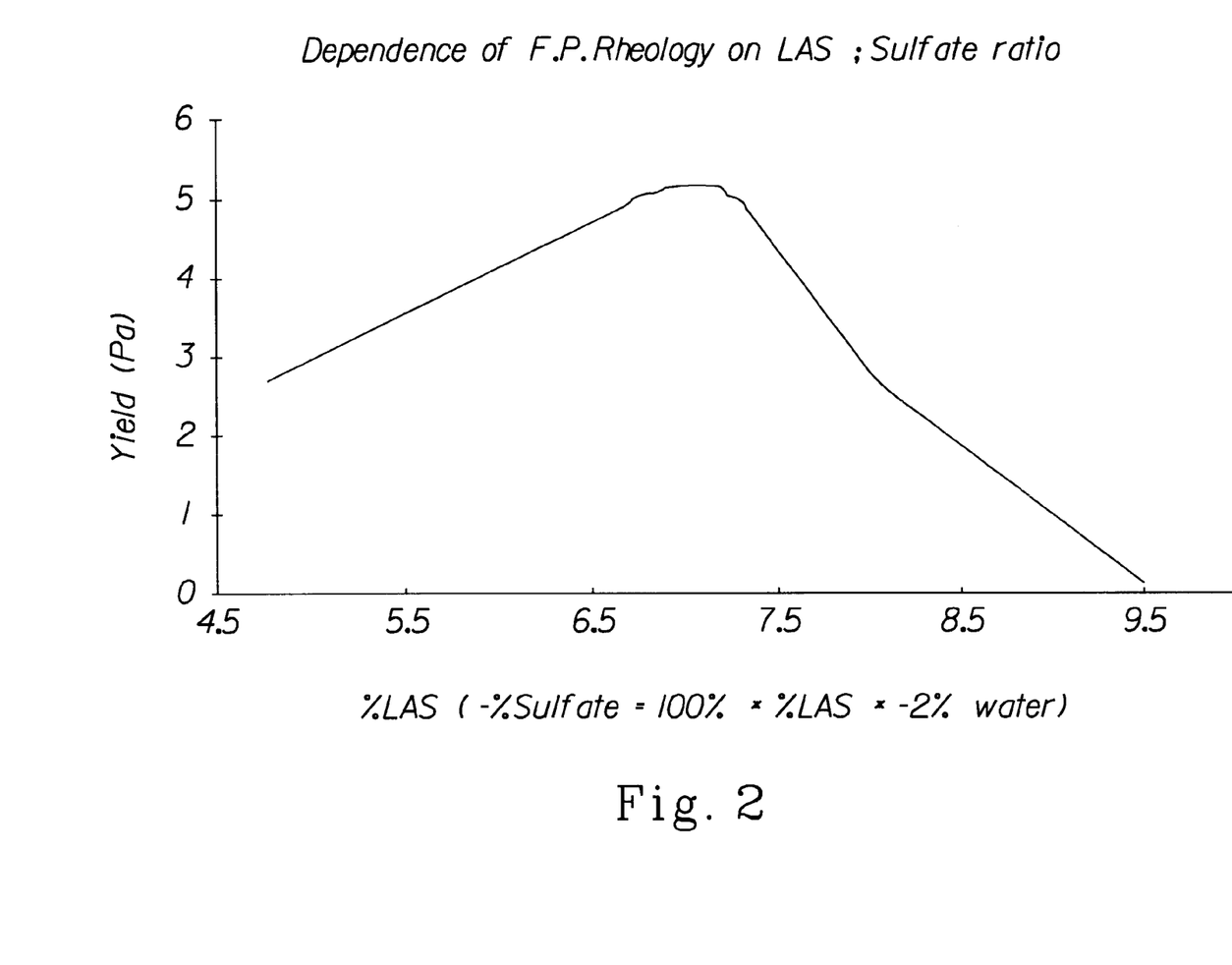
FIG. 2 is a graph of yield values for certain mixtures of surfactant systems, both conventional and according to the present invention, and non-aqueous liquids.

One method for characterizing the ability of the structuring particles of this invention to structure liquids is through the use of yield measurements. Yield is defined as the shear stress value (Pa) at which the geometry stops moving, that is, the lowest stress needed to move a sample. Yield measurements for liquid mixtures comprising the structuring particles of this invention were taken and compared to the same measurements for liquid mixtures with little or no structuring particle. FIG. 2 represents the results of one such comparative measurement. The compositions tested and test conditions that resulted in the data plotted in FIG. 2, are given in Example I below.

In summary, FIG. 2 shows a bell-shaped curve with a peak yield value of about 5 to 6 Pa. All of the compositions tested in FIG. 2 are linear alkyl benzene sulfonate dissolved in butoxy propoxy propanol and nonionic surfactant, as defined in Example I. The amount of structuring linear alkyl benzene sulfonate in each sample was varied based on the ratio of linear alkyl benzene sulfonate to sodium sulfate during the surfactant processing. It is important to note that commercial suppliers of linear alkyl benzene sulfonate operate at a high ration of linear alkyl benzene sulfonate to sodium sulfate, which results in linear alkyl benzene sulfonate with a low yield value, that is, below about 1 Pa on FIG. 2.

For purposes of this invention, when at least about 25%, preferably about 27%, most preferably about 30%, by weight of the surfactant systems of this invention are mixed with a non-aqueous liquid, for example, butoxy propoxy propanol, cyclohexane, nonionic surfactants and mixtures thereof, the resulting mixture has a yield of at least about 2.0 Pa, preferably at least about 3.0 Pa, and most preferably at least about 4.0 Pa when measured at 20 sec$^{-1}$ and 25° C. Most preferably, the mixtures defined above comprise the surfactant systems of this invention and a $C_{12-13}$ alcohol ethoxylate with an average degree of ethoxylation of 5.

When at least about 1%, preferably at least about 3.0%, and most preferably about 5.0%, by weight of the structuring particles of this invention are mixed with a non-aqueous liquid, for example, butoxy propoxy propanol, cyclohexane, nonionic surfactants and mixtures thereof, the resulting mixture has a yield of at least about 2.0 Pa, preferably at least about 3.0 Pa, and most preferably about 4.0 Pa when measured at 20 sec$^{-1}$ and 25° C. Most preferably, the mixtures defined above comprise the structuring particles of this invention and a $C_{12-13}$ alcohol ethoxylate with an average degree of ethoxylation of 5.

Mixtures of a non-aqueous liquid and either the surfactant systems or structuring particles defined above should be capable of suspending particulate material that ranges in size from about 0.1 to 1500 microns. While a variety of particles are contemplated for use in the structured liquids of this invention, preferred particles are selected from the group consisting of pigments, peroxygen bleaching agents, bleach activators, colored speckles, organic detergent builders, inorganic alkalinity sources and mixtures thereof.

X-Ray Diffraction

Another method for identifying the structuring particles of this invention is through the use of x-ray diffraction. X-ray diffraction techniques are well known to those skilled in the art and these techniques are conventional methods for characterizing the structure of liquids and solids. A detailed description of one exemplary SAXS x-ray measurement is reported below in Example II.

The surfactant systems and the structuring particles of this invention should exhibit a peak when measured by SAXS x-ray diffraction, wherein the peak's center is between about the 1.5 to 2.5 positions on the 2 theta axis. The peak should be present regardless if the surfactant system or the structuring particles are analyzed dry or if they are mixed with a non-aqueous liquid, preferably butoxy propoxy propanol, before being analyzed by SAXS x-ray diffraction. The mixture of surfactant system or structuring particles with non-aqueous liquid should comprise at least about 50%, by weight of the surfactant system or structuring particle.

Figure 3:
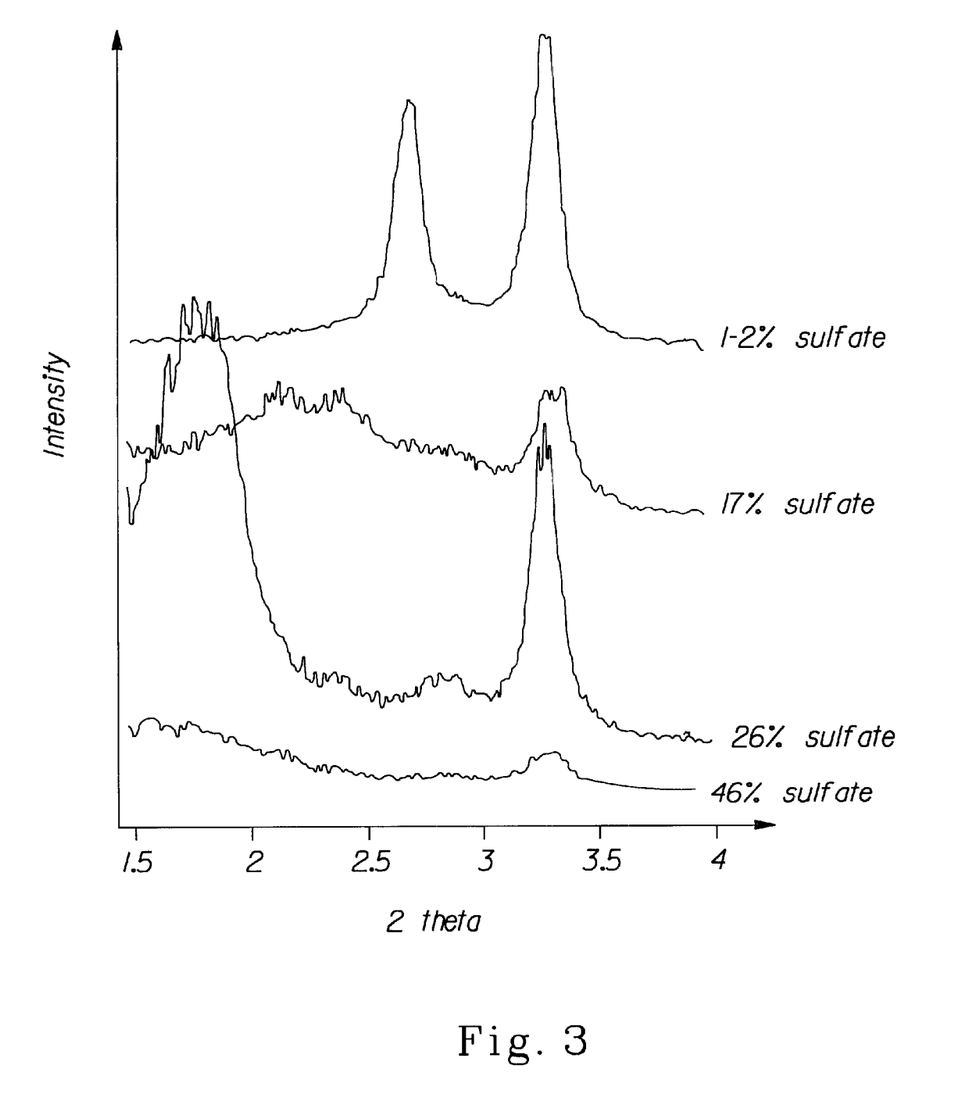
FIG. 3 is a graphical representation of x-ray diffraction patterns for conventional surfactants and certain structuring particles according to this invention.
Figure 4:
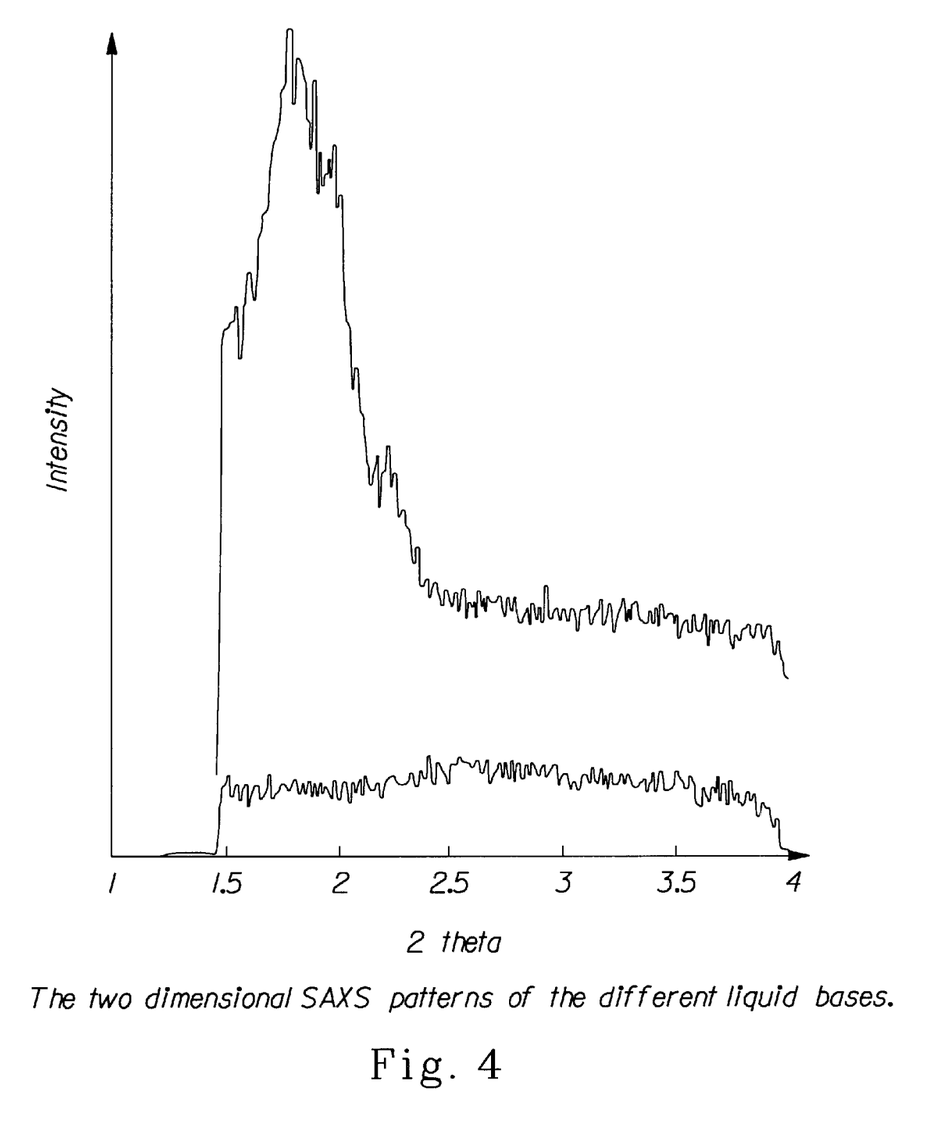
FIG. 4 is a graphical representation of x-ray diffraction patterns for two mixtures; a conventional surfactant and a non-aqueous liquid, and structuring particles of this invention and a non-aqueous liquid.

SAXS measurements were performed on: dry flakes of the surfactant systems and the structuring particles of this invention; dry flakes of conventional surfactant systems; mixtures of non-aqueous liquids with conventional linear alkyl benzene sulfonate; and mixtures of non-aqueous liquids with the structuring particles of this invention. FIGS. 3 and 4 are graphs of data that exemplify these measurements, wherein FIG. 3 represent the x-ray patterns for the dry flakes, and FIG. 4 shows the patterns for the liquid mixture measurements. The structuring particles of this invention are evidenced by the peaks, wherein the peak's center is between about the 1.5 to 2.5 positions on the 2 theta axis, see the lower three lines graphed in FIG. 3, and see also the uppermost line graphed in FIG. 4. The uppermost line in FIG. 3 and the bottom line in FIG. 4 represent conventional linear alkyl benzene sulfonate that contains little or no structuring particles. It is interesting to note that the peak at about the 2.75 position on the 2 theta axis of FIG. 3, which is clearly evident in the upper line, is largely absent from the lower three lines. The absence of the peak at about 2.75 is another indication that the compositions of the present invention have a substantially different physical structure than conventional surfactant systems.

FIG. 4 demonstrates that the structuring particles of this invention are substantially insoluble in non-aqueous solutions. The lower line on FIG. 4 represents the spectrum for a mixture of conventional linear alkyl benzene sulfonate, butoxy propoxy propanol and nonionic surfactant. The upper line on FIG. 4 represents the spectrum for a mixture of linear alkyl benzene sulfonate processed according to the present claims, that is, it comprises structuring particles, and butoxy propoxy propanol and nonionic surfactant. The upper line of FIG. 4 has a pronounced peak at about the 2 position on the 2 theta axis, indicating the presence of undissolved structuring particles according to the present invention. The lower line graphed in FIG. 4 has no peaks, which indicates that there are no structuring particles in the mixture, and that all of the linear alkyl benzene sulfonate dissolved in the non-aqueous liquid mixture.

Using SAXS x-ray diffraction, the structuring particles of this invention exhibit a peak, wherein the peak's center is between about the 1.5 to 2.5 positions on the 2 theta axis, preferably between about the 1.6 to 2.2 positions on the 2 theta axis, and most preferably between about the 1.7 to 2.0 positions on the 2 theta axis. Those skilled in the art will know that a "peak" has a standard definition which depends on the noise level of the x-ray equipment. The intensity of a peak is not an indication of concentration of the structuring particles. However, at concentrations of less than about 5%, by weight of structuring particles in a surfactant system, a peak between about the 1.5 to 2.5 positions on the 2 theta axis is rarely discernible due to limitations in the equipment sensitivity.

It is important to note that while a peak between the 1.5 to 2.5 positions in the 2 theta axis indicates the presence of structuring particles according to the present invention, the amount of the structuring particles must be determined by other methods, such as centrifuging. One such method for determining the amount of structuring particles in a surfactant system, or in a mixture of structuring particles and non-aqueous liquid is defined in Example III below, other methods will be known to those skilled in the art.

EXAMPLES

The following Examples are intended to illustrate certain aspects of the present invention, but the Examples are not meant to limit the scope of this invention in any way. In the following examples the following abbreviations are used
"CLASS"=structuring particles of sulfate and linear alkyl benzene sulfonate, a structuring particle
"LAS"=linear alkyl benzene sulfonate, non-structuring
"BPP"=butoxy propoxy propanol

Example I
Determination of Yield Values

The following procedure is used for determining yield values for mixtures of non-aqueous liquids and surfactant systems comprising a structuring particle. Table 1 below shows yield and viscosity measurements for surfactant systems made according to the present claims and conventional surfactants. The ratio of NaLAS:Na2SO4 in the first column of Table 1 corresponds to the ratio in the present method claims.

1. Dried flakes of a surfactant system comprising LAS and CLASS are dispersed in nonionic surfactant (Neodol 1-5 or Neodol 23-5), at 26.7 wt % LAS/CLASS, 73.3 wt. % nonionic surfactant. The mixture is mixed with an IKA mixer until all of the LAS/CLASS is wetted. (Mixing time is dependent on batch size, etc.)
2. The LAS/CLASS/nonionic mixture is gravity fed through a rotor/stator colloid mill set at 40 um.
3. BPP is added to the milled LAS/CLASS/nonionic mixture to equal: 9% LAS/CLASS, 48.8% Neodol 1-5, and 42.2% BPP, by weight.
4. The BPP/LAS/CLASS/nonionic mixture is stirred at minimum speed required to get adequate mixing for approximately 15 min.
5. The rheology of the mixture, specifically the yield (Pa) and the viscosity (cps) is measured @20 l/s, these values are used to determine level of structure.
6. The equipment and method used for the rheology measurements are as follows:

Equipment:
  CarrieMed CSL2 Rheometer
  Geometry: 4 cm steel parallel plate
  Gap setting: 500 um-200 um
  Temperature: 25° C.
Method:
  Preshear: 125 l/s constant shear rate for 2 min.
  Down curve: continuous ramp, controlled stress @ 50 Pascals down to 0.1 Pascals with 3 min ramp duration.

TABLE I

| NaLAS*:Na2SO4 | Yield (Pa) | Viscosity (cps) |
|---|---|---|
| 75:25 | 5.0 | 775 |
| 50:50 | 2.5 | 385 |
| 85:15 | 0.7 | 306 |
| 90:10 | 0.1 | 96 |
| 100:0 | 0.1 | 26 |

*NaLAS = the LAS prior to processing

Example II
SAXS Measurements

SAXS measurements are conducted with a Rigaku-type Kratky camera using an infinite slit geometry. Ni-filtered CuKα radiation are produced using a Rigaku rotating anode device (12 kW) operated at 40 kV and 100 mA. Scattering patterns are collected with a linear position sensitive proportional detector (Braun OED-SOM). The calibration is achieved by using the sixth order of an oriented collagen sample to determine the position of the primary beam, with respect to the channel number. Once this is achieved, all other peak positions, as observed by the channel numbers, can be correlated to scattering angles, or s-values. For example, a peak position sixth order peak of collagen is 276.2 ($x_2$), while a peak position for the primary beam is 138.6 ($x_1$). The corresponding s-value for the sixth order peak of collagen is 0.009375 Å$^{-1}$ ($y_2$), and The corresponding s-value for the primary beam is 0 Å$^{-1}$ ($y_1$). To calculate the s-values one uses the following equations:

$$(y_2-y_1)*(x-x_1)=(x_2-x_1)*(y-y_1)$$

$$y=((y_2-y_1)*(x-x_1)/(x_2-x_1))+y_1.$$

Example III
Determination of the Amount of Structuring Particles

The following is one method for determining the amount of structuring particles in a surfactant system, or for determining the amount of structuring particles in a mixture comprising structuring particles and a non-aqueous liquid. The following BPP/LAS/CLASS/nonionic mixture is prepared:

9% LAS containing an unspecified amount of CLASS particles
42.2% BPP
48.8% nonionic surfactant (Neodol 1-5 or Neodol 23-5)

It will be understood by those skilled in the art that the 9% LAS contains non-surfactant materials, which include residual by-products of the manufacturing process, and unreacted initial ingredients. These non-surfactant materials are accounted for in the analytical method described below. Moreover, to insure that all of the soluble material dissolves in the liquid, non-aqueous mixture, it is preferred that the amount of LAS tested be below about 10%. At concentrations of substantially greater than 10% the liquid mixture may become saturated and certain soluble material could be centrifuged out, yielding an inflated reading for the amount of insoluble material. Once again, this potential problem is avoided by keeping the test sample below about 10%, by weight of the mixture.

After dispersion of the LAS in the non-aqueous mixture, part of the mix is centrifuged at 12000 rpm for 3 hours using a Beckman model J2-21 centrifuge. The supernatant is separated from the centrifuge tube and, using conventional surfactant titration methods, the amount of LAS present in the supernatant is determined. A non-centrifuged sample, otherwise identical to the centrifuged sample, is also analyzed by conventional surfactant titration methods for the amount of LAS. The difference between the amount of LAS in the non-centrifuged sample and the amount of LAS in the supernatant of the centrifuged sample equals the amount of insoluble material, or CLASS particles, by weight, that was in the original centrifuged sample. The amount of CLASS, by weight, divided by the total weight of LAS in the centrifuged sample, determined by titrating the uncentrifuged sample, yields the weight percent of CLASS in the surfactant system.

Example IV
Preparation of LAS Powder

One preferred use for the structuring particles and surfactant systems of the present invention is in non-aqueous, heavy-duty, liquid laundry detergent compositions. An example of one such surfactant system which comprises structuring particles for use in non-aqueous liquid detergent compositions is given below. Specifically, sodium $C_{12}$ linear alkyl benzene sulfonate (NaLAS) is processed into a powder containing two phases. One of these phases is soluble in the non-aqueous liquid detergent compositions herein and the other phase is insoluble. It is the insoluble fraction that is the structuring particle, which adds structure and particle suspending capability to the non-aqueous phase of the compositions herein.

A surfactant system according to this invention is produced by taking a slurry of NaLAS (Pilot Chemical Co., Calsoft L-50) in water (approximately 40–50% active) combined with dissolved sodium sulfate (approximately 3–15% active) and hydrotrope, sodium sulfosuccinate (approximately 1–3%). The hydrotrope and sulfate are used to improve the characteristics of the dry powder. A drum dryer is used to dry the slurry into a flake. When the NaLAS is dried with the sodium sulfate, two distinct phases are created within the flake. The insoluble phase creates a network structure of aggregate small particles (0.4–2 um) which allows the finished non-aqueous detergent composition to suspend solids.

The surfactant system prepared according to this example has the following makeup shown in Table IV, A.

TABLE IV, A

| Surfactant System | |
|---|---|
| Component | Wt. % |
| NaLAS* | 75% |
| Sulfate | 25% |
| % insoluble LAS | 20% |
| # of phases (via X-ray diffraction) | 2 |

*May include residual amounts of water, sulfate and other contaminants

A non-aqueous, liquid detergent composition using a surfactant system according to the present invention is presented below.

TABLE IV, B

| Non-Aqueous Liquid Detergent Composition with Bleach | |
|---|---|
| Component | Wt % |
| Conventional LAS | 12–15 |
| Surfactant System From Table IV, A | 1–4 |
| $C_{12-13}$EO = 5 alcohol ethoxylate | 22 |
| BPP | 19 |
| Sodium citrate dihydrate | 3 |
| Bleach activator | 5.9 |
| Sodium carbonate | 9 |
| Maleic-acrylic copolymer | 3 |
| Colored speckles (suspended particles) | 0.4 |
| Ethylene diamine disuccinic acid | 1 |
| Cellulase Prills | 0.1 |
| Amylase Prills | 0.4 |
| Ethoxylated diamine quat | 1.3 |
| Sodium Perborate | 15 |
| Optionals including: brightener, colorant, perfume, thickener, suds suppresor, colored speckles etc. | balance |
| | 100% |

The resulting Table IV, B composition is a stable, non-aqueous, heavy-duty liquid laundry detergent which provides excellent stain and soil removal performance.

What is claimed is:

1. A surfactant system capable of structuring a non-aqueous liquid composition wherein the surfactant system comprises at least about 5% of a structuring particle that is substantially insoluble in non-aqueous liquids, wherein the structuring particle consists of a surfactant and a sulfate and wherein the surfactant system exhibits a peak when measured by SAXS x-ray diffraction, wherein the peak's center is between about 1.5 to 2.5 positions on the 2 theta axis.

2. The surfactant system of claim 1, further comprising a surfactant selected from the group consisting of anionic, nonionic, cationic, amphoteric surfactants and mixtures thereof.

3. The surfactant system of claim 1, wherein a well dispersed mixture of at least about 25%, by weight of the surfactant system and a $C_{12-13}$ alcohol ethoxylate with an average degree of ethoxylation of 5, results in the mixture having a yield of at least about 2.0 Pa when measured at 20 sec$^{-1}$ and 25° C.

4. The surfactant system of claim 1, wherein the surfactant system comprises at least about 6% of the structuring particles.

5. The surfactant system of claim 1, wherein the surfactant system comprises at least about 10% of the structuring particles.

6. The surfactant system of claim 3, wherein the mixture comprises at least about 30%, by weight of the surfactant system.

7. The surfactant system of claim 3, wherein the mixture has a yield of at least about 3.0 Pa when measured at 20 sec$^{-1}$ and 25° C.

8. The surfactant system of claim 3, wherein the mixture has a yield of at least about 4.0 Pa when measured at 20 $\sec^{-1}$ and 25° C.

9. The surfactant system of claim 3, wherein the mixture is capable of suspending particulate material that ranges in size from about 0.1 to 1500 microns, and is selected from the group consisting of pigments, peroxygen bleaching agents, bleach activators, colored speckles, organic detergent builders, inorganic alkalinity sources and mixtures thereof.

10. The surfactant system of claim 1, wherein the structuring particle comprises sulfate and $C_{6-20}$ linear alkyl benzene sulfonate.

11. The surfactant system of claim 1, wherein the peak's center is between about 1.6 to 2.2 positions on the 2 theta axis 12. The surfactant system of claim 1, wherein the peak's center is between about the 1.7 to 2.0 positions on the 2 theta axis.

13. A structuring particle according to claim 1 made by a method which comprises the following steps:
   a) making a surfactant paste comprising an alkali metal surfactant and an aqueous solution in a weight ratio of from about 2:1 to about 1:4;
   b) combining the paste and an alkali metal sulfate in a weight ratio of alkai metal surfactant to alkali metal sulfate of from about 4:1 to about 1:2;
   c) agitating the paste and the metal sulfate until a well dispersed mixture is obtained;
   d) allowing the well dispersed mixture to stand with no agitation for at least about two hours; and
   e) drying the well dispersed mixture.

14. The structuring particle of claim 13, wherein the alkali metal surfactant comprises sodium $C_{6-20}$ linear alkyl benzene sulfonate and the alkali metal sulfate comprises sodium sulfate.

15. The structuring particle of claim 13, wherein the ratio of the alkali metal surfactant to the aqueous solution in the surfactant paste is from about 1:1 to about 1:3.

16. The structuring particle of claim 13, wherein the ratio of the alkali metal surfactant to the alkali metal sulfate is from about 3:1 to about 1:1.

17. The structuring particle of claim 13, wherein the structuring particle comprises sulfate and $C_{6-20}$ linear alkyl benzene sulfonate.

18. The structuring particle of claim 13, wherein the structuring particles exhibit a peak when measured by SAXS x-ray diffraction, wherein the peak's center is between about the 1.5 to 2.5 positions on the 2 theta axis.

19. The structuring particle of claim 18, wherein the peak's center is between about the 1.6 to 2.2 positions on the 2 theta axis.

20. The structuring particle of claim 18, wherein the peak's center is between about the 1.7 to 2.0 positions on the 2 theta axis.

21. A structuring particle consisting of a surfactant and a sulfate, wherein the structuring particle exhibits a peak when measured by SAXS x-ray diffraction, wherein the peak's center is between about 1.5 to 2.5 positions on the 2 theta axis.

22. The structuring particle of claim 21, wherein the peak's center is between about 1.6 to 2.2 positions on the 2 theta axis.

23. The structuring particle of claim 21, wherein the peak's center is between about the 1.7 to 2.0 positions on the 2 theta axis.

24. The structuring particle of claim 21, wherein the particle comprises sulfate and a surfactant which comprises a sulfonate head group.

25. A surfactant system capable of structuring a non-aqueous liquid composition wherein the surfactant system comprises at least about 5% of a structuring particle that is substantially insoluble in non-aqueous liquids, wherein the structuring particle consists of one or more sulfates and one or more surfactants.

26. A mixture comprising at least 1% by weight of the mixture of a structuring particle according to claim 1, and a $C_{12-13}$ alcohol ethoxylate with an average degree of ethoxylation of 5, results in the mixture having a yield of at least 2.0 Pa when measured at 20 $\sec^{-1}$ and 25° C.

27. The mixture according to claim 26 wherein the mixture comprises at least about 3% by weight of the mixture of the structuring particle.

28. The mixture according to claim 26 wherein the mixture comprises at least about 5% by weight of the mixture of the structuring particle.

29. The mixture according to claim 26 wherein the mixture has a yield of at least about 3.0 Pa when measured at 20 $\sec^{-1}$ and 25° C.

30. The mixture according to claim 26 wherein the mixture has a yield of at least about 4.0 Pa when measured at 20 $\sec^{-1}$ and 25° C.

31. The mixture according to claim 26 wherein the mixture is capable of suspending particulate material that ranges in size from about 0.1 to 1500 microns, and is selected from the group consisting of pigments, peroxygen bleaching agents, bleach activators, colored speckles, organic detergent builders, inorganic alkalinity sources and mixtures thereof.

32. A mixture comprising at least about 1% by weight of the mixture of a structuring particle, wherein the structuring particle consists of a surfactant and a sulfate, and a $C_{12-13}$ alcohol ethoxylate with an average degree of ethoxylation of 5, results in the mixture having a yield of at least about 2.0 Pa when measured at 20 $\sec^{-1}$ and 25° C.

33. The mixture according to claim 32 wherein the mixture comprises at least about 5% by weight of the mixture of the structuring particle.

34. The mixture according to claim 32 wherein the mixture has a yield of at least about 4.0 Pa when measured at 20 $\sec^{-1}$ and 25° C.

35. The mixture according to claim 32 wherein the mixture is capable of suspending particulate material that ranges in size from about 0.1 to 1500 microns, and is selected from the group consisting of pigments, peroxygen bleaching agents, bleach activators, colored speckles, organic detergent builders, inorganic alkalinity sources and mixtures thereof.

36. The mixture according to claim 32 wherein the surfactant comprises a $C_{6-20}$ linear alkyl benzene sulfonate.

37. The mixture according to claim 32 wherein the surfactant comprises a sulfonate head group.

* * * * *